Nov. 27, 1956  H. D. SMITH  2,772,101
FITTING FOR FLEXIBLE WALL TANK
Filed Feb. 3, 1954  2 Sheets-Sheet 1
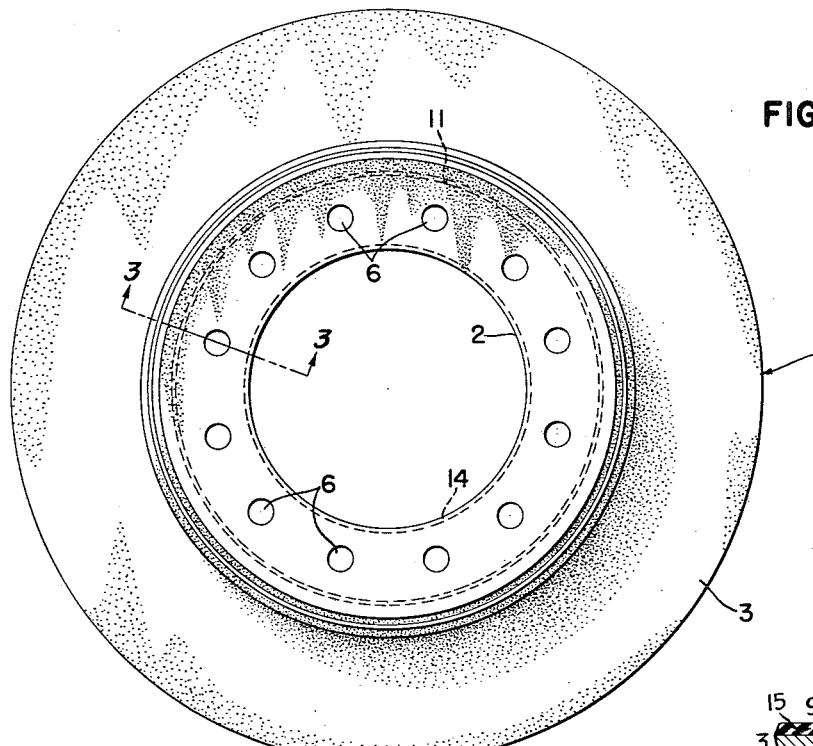
FIG. 1
FIG. 8
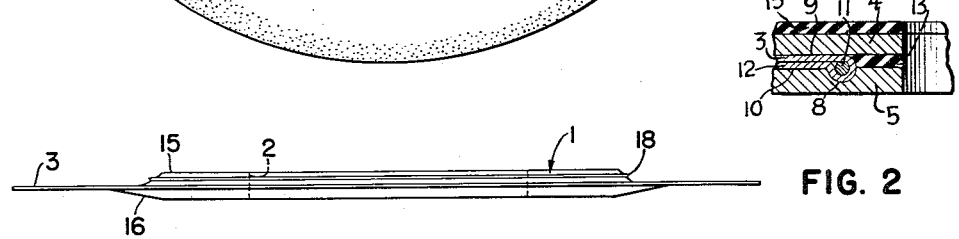
FIG. 2
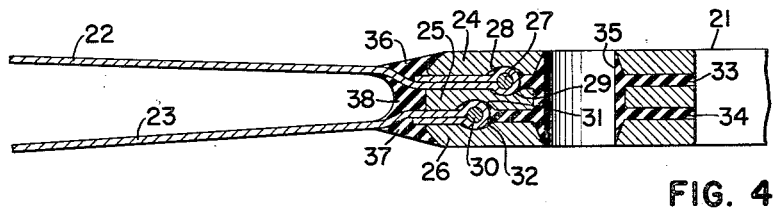
FIG. 4
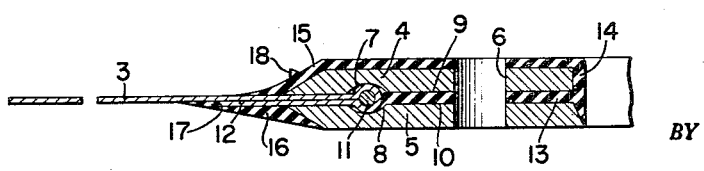
FIG. 3
INVENTOR.
HERBERT D. SMITH
BY
R. L. Miller
ATTORNEY Nov. 27, 1956 H. D. SMITH 2,772,101
FITTING FOR FLEXIBLE WALL TANK
Filed Feb. 3, 1954 2 Sheets-Sheet 2

INVENTOR.
HERBERT D. SMITH
BY
R.L. Miller
ATTORNEY

2,772,101
FITTING FOR FLEXIBLE WALL TANK

Herbert D. Smith, Akron, Ohio, assignor to The Goodyear Tire & Rubber Company, Akron, Ohio, a corporation of Ohio Application February 3, 1954, Serial No. 407,911

4 Claims. (Cl. 285—200)

The present invention relates to a tank fitting for defining an opening in a tank and the like. More particularly, the invention pertains to an improved construction for fittings on which attachments, such for example, as connectors, gauges, conduits and the like, are mounted and is especially adapted for use with flexible fuel containers such, for example, as self-sealing or bladder-type containers.

The flexible fuel containers, both self-sealing and non-sealing, used in modern aircraft, have been constantly improved so that presently the containers are relatively light weight when compared to the containers of several years ago. As a result it is desirable that the fitting constructions be correspondingly reduced in weight if possible and much work has been done along this line. A large weight saving has been accomplished in many types of fittings by the use of strong light-weight textile materials for the flanges that tie the fitting into the container wall. Nylon has been the principal material used and, although unaffected by the fuels in the container, the fuel is wicked by the nylon. As a result it is necessary to prevent the flange material from wicking fuel to the outside of the container.

It is therefore an object of this invention to provide a fitting that is light weight and at the same time very strong.

Another object of the invention is to provide a fitting that has a very flexible flange that is firmly anchored to the fitting.

A further object of the invention is to provide a fitting in which the fabric flange or flanges are mounted so that any fuel wicked thereby does not reach the outside of the container.

A still further object of the invention is to provide a fitting construction which may be readily adapted to single or multiple flange construction.

These and other objects of this invention will appear hereinafter as the description thereof proceeds, the features, arrangements and combinations being clearly pointed out in the specification and in the claims thereunto appended.

In the drawings:

Fig. 1 is a plan view of a fitting;

Fig. 2 is a front elevation;

Fig. 3 is an enlarged partial section taken on line 3—3 of Fig. 1;

Fig. 4 is an enlarged partial section of a modification of the invention;

Fig. 8 is an enlarged partial section of a further modification of the invention.

Figure 5:
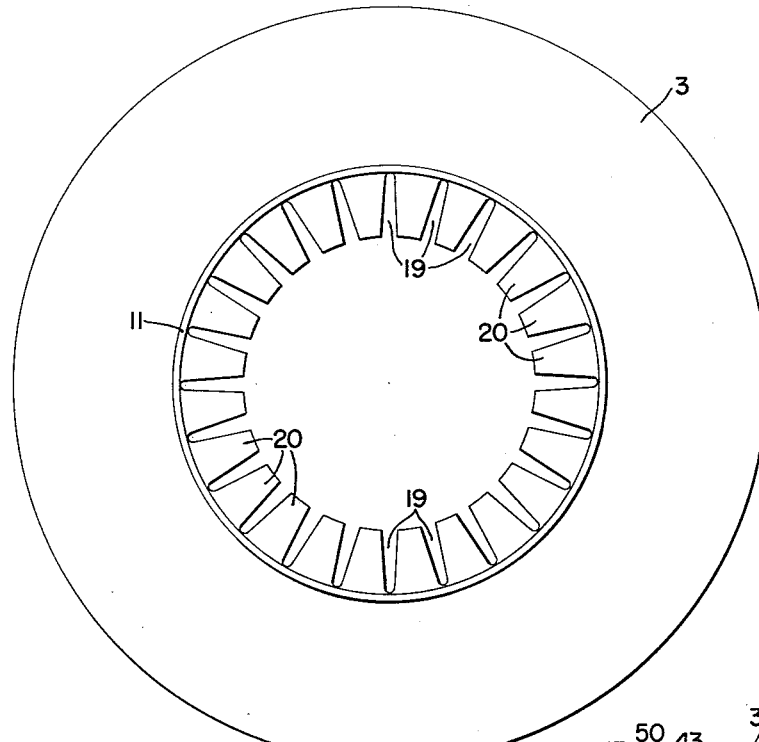
Fig. 5 is a plan view of the flange portion of the fitting at one stage of preparation.

Referring to Figs. 1 and 2, the numeral 1 indicates one form of the tank fitting which includes the opening 2 in the fitting. As shown the opening 2 is circular although the opening may be of any shape desired with the various parts of the fitting being shaped correspondingly. The flange 3 provides a means of attaching the fitting to the container wall and is of a high-strength, light-weight fabric material, such for example as nylon. The single flange 3 provides sufficient strength to attach a fitting to a light-weight tank structure such as the well-known bladder cells or those constructed of one or two plies of fuel-resistant fabrics. The flange 3 is of sufficient size so as to provide an adequate surface for attaching the fitting to the wall structure of the fuel cell (not shown) and at the same time is sufficiently flexible so that it will conform to the contour of the cell at the point of attachment. Preferably the flange is rubberized or coated with a fuel-resistant plastic material to assist in attaching the fitting to the wall structure and obtaining good adhesion between the flange and components of the fitting.

More specific details of the fitting construction are shown in Fig. 3. The ring members 4 and 5 are preferably formed of a light-weight rigid fuel-impervious material such as aluminum either cast or stamped and, for the purpose of illustration, include a series of openings 6 to mount attachments such as connectors, gauges, etc. thereto. Other well-known means of providing for the mounting of attachments to the fitting may be provided if desired. The rings 4 and 5 are in spaced substantially parallel relation with the ring 4 being superposed over ring 5. The distance between the rings 4 and 5 generally corresponds to the thickness of the doubled portion of the flange as will be described later.

As shown, recesses 7 and 8 are formed in the opposing surfaces 9 and 10 of the rigid members 4 and 5 respectively. If desired a recess may be formed in only one of the opposing surfaces 9 or 10 and as shown in Fig. 8 the recess 8 is formed in the surface 10 of the rigid member 5. One means of attaching the flange 3 to the ring members 4 and 5 is to arrange a retaining ring 11 in the recesses 7 and 8 with the inner peripheral portion 12 of the flange 3 being wrapped about or folded back on itself around the ring 11. The rigid ring members 4 and 5 engage the retaining ring and the portion of the flange wrapped thereabout so as to hold the ring in place to prevent movement between the flange and the rigid members. It is desirable though not essential that the folded-back portion of the flange extend at least to the outer periphery of the ring members 4 and 5 to provide sufficient area to obtain good adhesion. A layer 13 of fuel-resistant plastic material such as neoprene, Buna-N, Thiokol and the like lies between the opposed surfaces of the rigid ring members 4 and 5 and extends inwardly from the recesses 7 and 8 to the inner periphery of the rigid members 4 and 5. If desired a layer 14 of plastic material may be formed around the periphery of the opening 2 in the fitting and onto the surface of the rigid ring 4 to provide a good seal for mounting the attachments.

In order to prevent localized stresses or a hinge point in the flange in the area immediately adjacent the outer periphery of the rigid ring members 4 and 5, portions 15 and 16 of fuel-resistant plastic material are applied to the opposite surfaces of the flange 3 so that the flexibility of the flange is gradually reduced in the area immediately adjacent the outer periphery of the ring members. The portion 16 of the fuel-resistant plastic extends a sufficient distance over the surface of the flange 3 to cover the end 17 of the folded-back portion of the flange. This prevents any fuel contacting the edge of the flange to reduce the possibility of wicking. For convenience of fabricating the fitting into the tank structure, a ridge 18 is formed about the fuel-resistant portion 15 to provide a point at which the fuel cell wall should be trimmed when the fitting is being attached.

Figure 6:
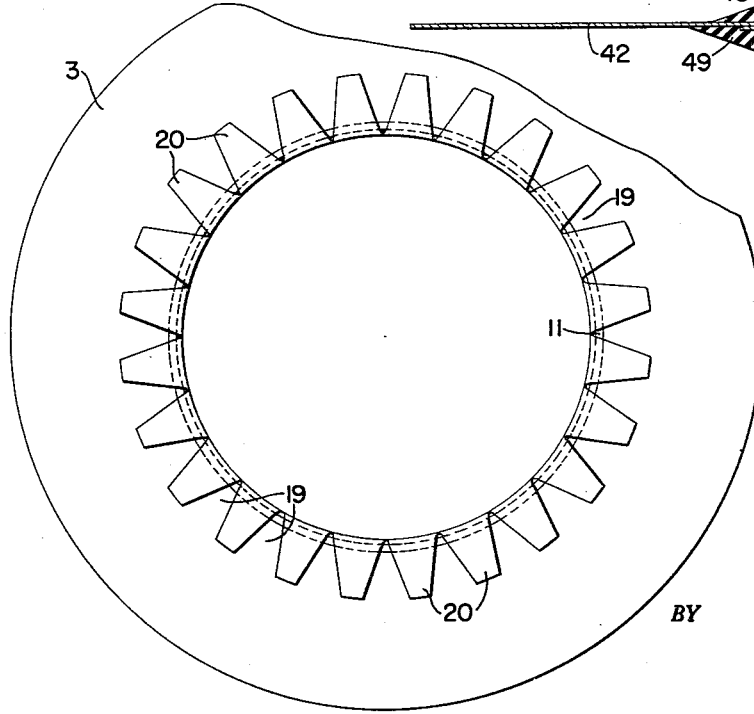
Fig. 6 is a plan view of the flange portion of the fitting at another stage of preparation.

In order to fold the inner periphery of the flange around the retaining ring 11, a series of radially extending notches 19 may be formed in inner periphery of the flange 3 as shown in Fig. 5. The bottom of the notch lies along the inner periphery of the retaining ring 11. As best seen in Fig. 6, the tabs 20, formed by the notches 19, are then folded out over the retaining ring 11 and down on the flange so as to hold the ring in place with respect to the flange. Preferably when the ring and flange are inserted in the recesses 7 and 8 of the rigid members 4 and 5, the ends of the tabs extend beyond the outer periphery of the rigid ring members. The double thickness of the flange between the rigid ring members 4 and 5 determines the thickness of layer 13 so that the rigid ring members 4 and 5 are substantially parallel in the finished fitting.

Advantageously the fitting 1 is fabricated by first attaching the ring to the flange in the method previously described. The fitting is then molded by any of the well-known techniques, such for example by placing the synthetic fuel-resistant layer 13 on the rigid ring member 5 and then the flange and retaining ring in the recess 8. The ring member 4 and fuel-resistant plastic portions 15 and 16 then are positioned in the mold and then vulcanized under heat and pressure to form an integral fitting with all of the portions being bonded together.

In Fig. 4 a modified form of a fitting 21 having two flanges 22 and 23 is illustrated. The ring members 24, 25 and 26 are in spaced substantially parallel superposed relation. Flange 22 is attached to the fitting 21 between the rigid ring members 24 and 25 with the retaining ring 27 arranged in the opposing recesses 28 and 29 in the rigid rings 24 and 25 respectively. Similarly the flange 23 is attached to fitting 21 between the rigid ring members 25 and 26 by means of retaining ring 30 in the recesses 31 and 32 of the rigid rings 25 and 26.

The fuel-resistant plastic material layers 33 and 34 extend from the recesses into the inner periphery of the fitting and as shown line the periphery of the opening 35 through the fitting. If desired the layers 33 and 34 may be extended out into the exposed surfaces of rigid rings 24 and 26 to form a seat and seal on which the attachments are mounted. Portions 36 and 37 of flexible fuel resistant plastic material extend from the outer periphery of the rigid ring members 24 and 26 out on the outer surfaces of flanges 22 and 23. A portion 38 of flexible fuel-resistant material around the outer periphery of the rigid ring 25 and between the flanges 22 and 23 maintains the flanges at the spacing required to receive the cell wall when incorporating the fitting into the cell structure. The portions 36, 37 and 38 prevent any concentrated stress areas which might possibly cause the flanges to rupture while the cell is in use.

Figure 7:
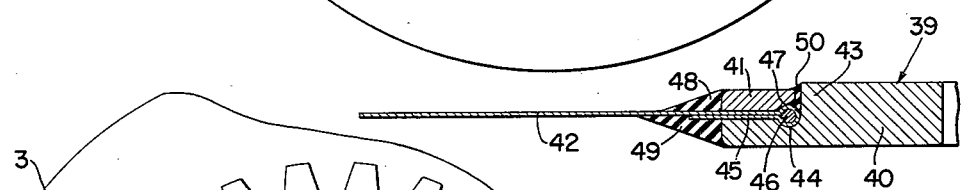
Fig. 7 is an enlarged partial section of further modification of the invention.

In Fig. 7 another modification of the invention is illustrated in which fitting 39 includes rigid ring members 40 and 41 and flange 42. The ring member 40 with a boss 43 in the central portion forms a shoulder around the periphery of the ring 40. A recess 44 is formed in the face 45 of the ring adjacent the boss 43 to receive the retaining ring 46 and the portion of the flange 42 folded thereabout as previously described. The second rigid ring member 41 surrounds the boss 43 and is in contact with and adhered to the surface of the flange 42. As shown the inner lower corner 47 of the ring 41 is chamfered to clear the projecting portion of the retaining ring 46 and flange 42.

Portions 48 and 49 of flexible fuel-resistant plastic material extend from the outer peripheries of the rings 40 and 41 out on the surfaces of the flange 42 to prevent localized stress in the flange. The space between the ring members 40 and 41 is filled with fuel-resistant plastic material 50 to seal the fitting so that any fuel wicking through the fabric cannot reach the outside of the container through space or joint between the parts of the fitting which are bonded together to form an integral structure.

In the modifications of the invention described, it is apparent that numerous shapes and sizes of fittings may be made to incorporate the invention. The flange or flanges in each modification are firmly and positively anchored in the fitting and any fuel passing through the fabric does not reach the outside of the container. In the double flange fitting the outer flange is attached to the outer wall of the container and does not contact the fuel. The inner flange is attached to the inner wall of the container and in contact with the fuel but is entirely insulated from any contact with the outer flange so that the fuel wicking therethrough cannot reach the outer flange or the outside of the container. The inner periphery of the flange or flanges only extends a relatively short distance in from the outer periphery of the rigid ring members. Irrespective of the method of mounting the attachments on the fittings, any openings or other devices required to mount the attachments pass through the fitting beween the inner periphery of the flanges and the rigid ring members. Any voids around the retaining ring and flange in the recesses are filled by the fuel-resistant plastic material during the molding operation.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A joint between a rigid and flexible wall, said flexible wall including a plastic impregnated fabric part and a resilient, flexible plastic coating on said fabric, comprising a pair of substantially parallel spaced apart coextensive rigid ring members of substantially equal outer diameters; an annular recess in at least one of the opposing faces of the ring members and intermediate the peripheries thereof; a retaining annulus of a diameter corresponding to that of said recess, the fabric part having an opening therein of less diameter than said retaining annulus with the inner periphery folded back on itself around said retaining annulus and extending at least to the outer periphery of said ring members, the retaining annulus and the portion of the fabric thereabout arranged in said recess in firm engagement therewith to positively position the fabric with respect to the rigid ring members; resilient, flexible plastic material between the rigid ring members in the space not occupied by the fabric and retaining ring to maintain the opposed faces of the rigid ring members in substantially parallel relation; and resilient, flexible plastic material bonded to the outer periphery of at least one of said rigid rings and in sealing relationship with the edge of the folded back fabric portion, said plastic material being bonded to said fabric and extending outwardly from the outer periphery of the rigid ring member, the thickness of said material decreasing as the distance from the rigid ring member increases to provide a graduated increase in the flexibility of the flexible wall.

2. A joint as described in claim 1 wherein said recess in one of said pair of rigid ring member is substantially semi-circular in cross-section, and a second similarly shaped opposed recess in said other rigid ring member said recesses together adapted to receive the annulus therebetween whereby said annulus is completely received and clamped in said recesses.

3. A joint as described in claim 1 having a layer of resilient, flexible plastic material of substantially uniform thickness bonded to the outer surface of the second of said rigid ring members and extending over and bonded to the outer periphery of the second of said rigid ring members, said material being bonded to the fabric and extending outwardly from the periphery of the second ring member on the opposite side of the fabric from that of the first mentioned outwardly extending resilient, flexible plastic material.

4. A joint between a rigid wall and a pair of flexible walls, each of said flexible walls including a plastic impregnated fabric part and a resilient, flexible plastic coating on said fabric, comprising three substantially parallel spaced apart co-extensive rigid ring members of substantially equal outer diameters; an annular recess in at least one of the opposing faces of each pair of opposing faces of the ring members, each of the recesses being intermediate the peripheries of the ring members; a retaining annulus for each recess having its cross sectional size and shape corresponding to that of its respective recess, each fabric part having an opening therein of less diameter than the inner diameter of one of said retaining annuli with the inner periphery thereof folded back on itself around said one of said retaining annuli and extending at least to the outer periphery of said ring members, each retaining annulus and the portion of the fabric thereabout arranged in its respective recess in firm engagement therewith to positively position the fabric with respect to the rigid ring members; resilient, flexible plastic material between the rigid ring members in the space not occupied by the fabric parts and retaining annuli to maintain the opposed faces of the rigid ring members in substantially parallel relation; resilient, flexible plastic material bonded to the outer periphery of each of the outer rings and in sealing relationship with the edge of the folded back fabric portion, said plastic material being bonded to said fabric and extending outwardly from the outer periphery of the rigid ring members, the thickness of said material decreasing as the distance from the rigid ring increases; and resilient, flexible plastic material extending around the outer periphery of the middle rigid ring member between the fabric parts and bonded thereto and graduating in thickness outwardly from the ring periphery substantially co-extensive with said first mentioned plastic material to cooperate therewith in providing a graduated increase in the flexibility of the flexible wall.

References Cited in the file of this patent

UNITED STATES PATENTS

| 1,258,615 | Fisher | Mar. 5, 1918 |
| 1,851,758 | Eger | Mar. 29, 1932 |
| 2,592,844 | Antonson | Apr. 15, 1952 |
| 2,675,252 | Haines | Apr. 13, 1954 |

FOREIGN PATENTS

| 1,091 | Switzerland | June 12, 1889 |
| 491,283 | France | May 28, 1919 |